United States Patent [19]
Aho et al.

[11] Patent Number: 5,790,544
[45] Date of Patent: Aug. 4, 1998

[54] ATM CELL-TO-FRAME REASSEMBLY METHOD AND APPARATUS FOR OVERRUN AVOIDANCE

[75] Inventors: Michael Edward Aho, Rochester; Albert Alfonse Slane, Oronoco, both of Minn.

[73] Assignee: International Business Machines Corporation, Armonk, N.Y.

[21] Appl. No.: 622,554

[22] Filed: Mar. 25, 1996

[51] Int. Cl.⁶ ............................................. H04L 12/56
[52] U.S. Cl. ..................... 370/395; 370/471; 370/474
[58] Field of Search .................................. 370/229, 230, 370/235, 395, 400, 409, 419, 420, 465, 470, 471, 473–476; 371/5.5

[56] References Cited

U.S. PATENT DOCUMENTS

| | | | |
|---|---|---|---|
| 5,375,121 | 12/1994 | Nishino et al. | 370/473 |
| 5,528,590 | 6/1996 | Iidaka et al. | 370/471 |
| 5,535,221 | 7/1996 | Hijikata et al. | 370/471 |
| 5,602,853 | 2/1997 | Ben-Michael et al. | 370/471 |
| 5,625,625 | 4/1997 | Oskouy et al. | 370/474 |

*Primary Examiner*—Benedict V. Safourek
*Assistant Examiner*—Seema S. Rao
*Attorney, Agent, or Firm*—Joan Pennington

[57] ABSTRACT

An ATM cell-to-frame reassembly method and apparatus are provided for overrun avoidance. For each END ATM USER connection a value defining a maximum number of ATM cells is provided. After receiving an ATM cell for an END ATM USER connection, the maximum number of ATM cells value associated with the particular END ATM USER connection is identified. A current frame length including the received ATM cell is calculated and compared with the identified maximum number of ATM cells value associated with the particular END ATM USER connection. Reassembly of the frame is continued responsive to the calculated current frame length being less than or equal to the identified maximum number of ATM cells value. Reassembly of the frame is terminated responsive to the calculated current frame length being greater than the identified maximum number of ATM cells value.

8 Claims, 4 Drawing Sheets

ATM CELL-TO-FRAME REASSEMBLY METHOD AND APPARATUS FOR OVERRUN AVOIDANCE

FIELD OF THE INVENTION

The present invention relates to an Asynchronous Transfer Mode (ATM), high-speed communications transport, and more particularly to an ATM cell-to-frame reassembly method and apparatus for overrun avoidance.

DESCRIPTION OF THE PRIOR ART

Multimedia communications involve the blending together of computer data processing, audio/video, and display technology in an interactive environment. Evolving multimedia applications such as desktop computer conferencing and video-on-demand bring with them the need for network access to shared or common real-time data.

A Moving Pictures Experts Group MPEG-2 standard for multimedia stream transport is described in "MPEG-2" International Organization for Standardization;

Organization Internationale De Normalisation (ISO/IEC 20 ITC1/SC29/WG11) Coding of Moving Pictures and Associated Audio. The MPEG-2 standard has defined a system layer that integrates multiple media sources into a single data stream with integrated time stamps (PCRs). The MPEG-2 standard has defined a fixed and variable rate encoding scheme for video streams that allows for variable size and quality of video streams. The MPEG-2 standard has defined a transport mechanism for other video encoding schemes, for example, MPEG-1.

The MPEG-2 multimedia stream is transported over a digital network which uses the ITU standards commonly referred to as Asynchronous Transfer Mode (ATM). The Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. It uses fixed size cells as a unit of transmission. With ATM AAL-5 (ATM Adaptation Layer for simple and efficient transport of frame traffic), each ATM cell carries 48 payload or data bytes. A segmentation and reassembly (SAR) layer is provided with all ATM END USERS for segmenting frames or packets into ATM cells and for reassembly of the ATM cells.

A problem exists with respect to the efficient use of storage for reassembly of ATM cells into frames while not risking an overrun of the storage. Specifically, an overrun of the ATM cell reassembly storage can occur on an AAL-5 connection where an end-system or END ATM USER sends a frame larger than the receiving system can handle. A frame larger than the receiving system can handle can result if the last ATM cell in an AAL-5 data stream is discarded. Moreover, if the AAL-5 SAR layer sends a frame too large for the software buffers in the END ATM USER, this could lead to disastrous results.

Known SAR arrangements use the same buffer size for all END ATM USER connections, which results in a poor fit for some connection users. Typically, the worst case solution allocates a maximum frame size for any and all SAR layer users.

A need exists for an improved ATM cell-to-frame reassembly method and apparatus for overrun avoidance.

SUMMARY OF THE INVENTION

Important objects of the present invention are to provide an improved ATM cell-to-frame reassembly method and apparatus for overrun avoidance; to provide such ATM cell-to-frame reassembly method and apparatus substantially without negative effects, and to provide such ATM cell-to-frame reassembly method and apparatus that overcome many of the disadvantages of prior art arrangements.

In brief, an ATM cell-to-frame reassembly method and apparatus are provided for overrun avoidance. For each END ATM USER connection a value defining a maximum number of ATM cells is provided. After receiving an ATM cell for an END ATM USER connection, the maximum number of ATM cells value associated with the particular END ATM USER connection is identified. A current frame length including the received ATM cell is calculated and compared with the identified maximum number of ATM cells value associated with the particular END ATM USER connection. Reassembly of the frame is continued responsive to the calculated current frame length being less than or equal to the identified maximum number of ATM cells value. Reassembly of the frame is terminated responsive to the calculated current frame length being greater than the identified maximum number of ATM cells value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
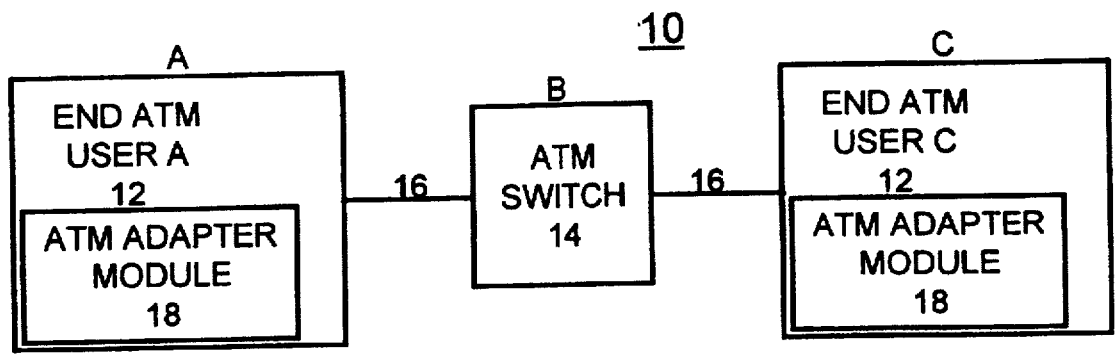
FIG. 1A is a block diagram representation illustrating a simple Asynchronous Transfer Mode (ATM) network.
Figure 1B:
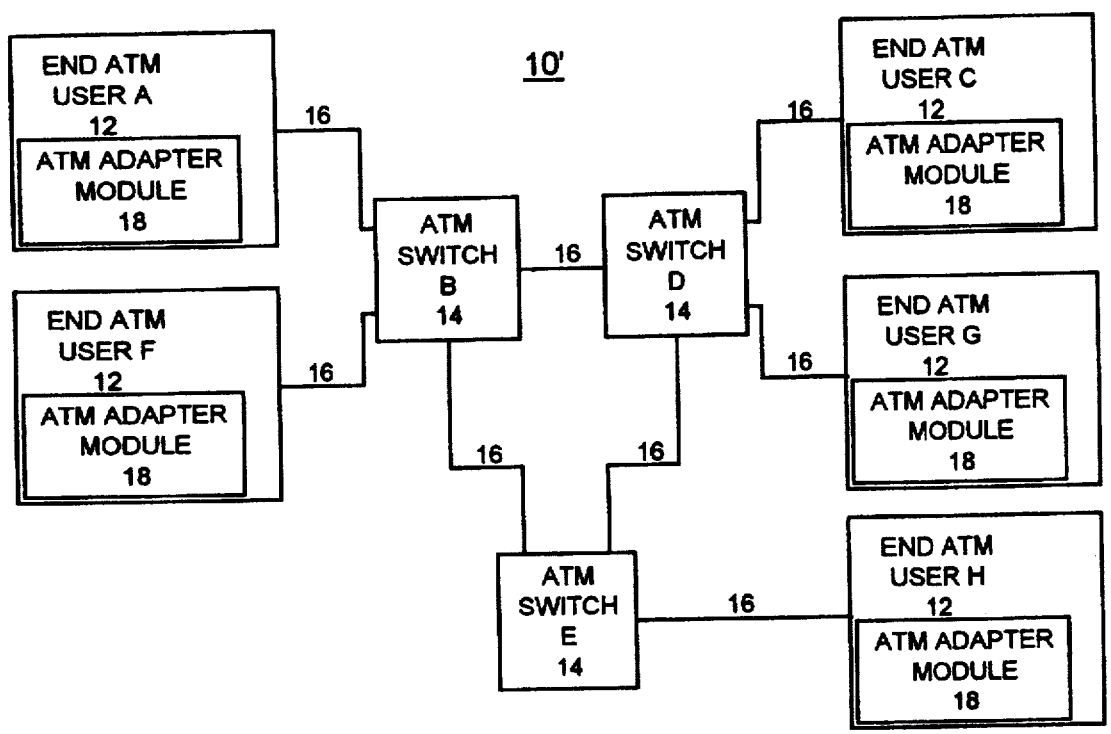
FIG. 1B is a block diagram representation illustrating a more complex Asynchronous Transfer Mode (ATM) network.

Having reference now to the drawings, in FIGS. 1A and 1B, a simple Asynchronous Transfer Mode (ATM) network 10 and a more complex Asynchronous Transfer Mode (ATM) network 10' are shown, respectively. ATM network 10 includes an END ATM USER A 12 and an END ATM USER C 12 (nodes A and C) connected to an ATM switch 14 (node B) with ATM cabling 16. Cabling 16 is connected to ATM adapter modules 18 in END ATM USER A 12 and USER C 12. Each END ATM USER 12 includes an ATM adapter module 18 providing an ATM segmentation and reassembly layer employed for an AAL-5 cell reassembly process of the invention.

In ATM network 10', multiple ATM END USERS A, F, C, G, and H 12 are connected with three ATM switches B, D, and E 14. It should be understood that the END ATM USERS A and C of ATM network 10 may be included in the more complex ATM network 10' shown in FIG. 1B. In general, ATM networks 10, 10' can become increasingly complex by adding more END ATM USERS 12, ATM switches 14, and other networking elements. END ATM USERS 12 may be computers, for example. A sending node or an ATM END USER 12 sends data packets or frames segmented into ATM cells on a connection basis across the transmission line 16 to a receiving node ATM END USER 12.

In accordance with an important feature of the invention, to improve their throughput and protect END ATM USERS 12 from overruns. ATM Cell-to-Frame reassembly overrun avoidance is provided on a connection basis. As used in the present description and claims, a connection is a session id between END ATM USERS 12 or a virtual channel connection (VCC). A connection is a virtual channel that groups data together so that multiple users at the sending node can send their data interleaved to multiple users at the receiving node, each END ATM USER 12 having its own connection. The receiving node ATM adapter module 18 collects the data on a connection basis and presents the data to its associated END ATM USER 12. Each connection of END ATM USERS 12 has a maximum number of bytes for reassembly. Each receiving node ATM END USER 12 notifies the associated receiving node ATM adapter module 18 of a buffer size to use for each connection. The buffer size is optimized for each END ATM USER 12. The cell-to-frame reassembly layer of ATM adapter module 18 identifies a value defining a maximum number of ATM cells for a frame for each particular connection that is used to allocate reassembly storage less than or equal to the maximum frame size of each connection. This value defining the maximum number of ATM cells for a frame for each particular connection is called a maximum segmentation data unit (MSDU) value. As a result, reassembly storage is better utilized, and throughput improves.

Figure 2A:
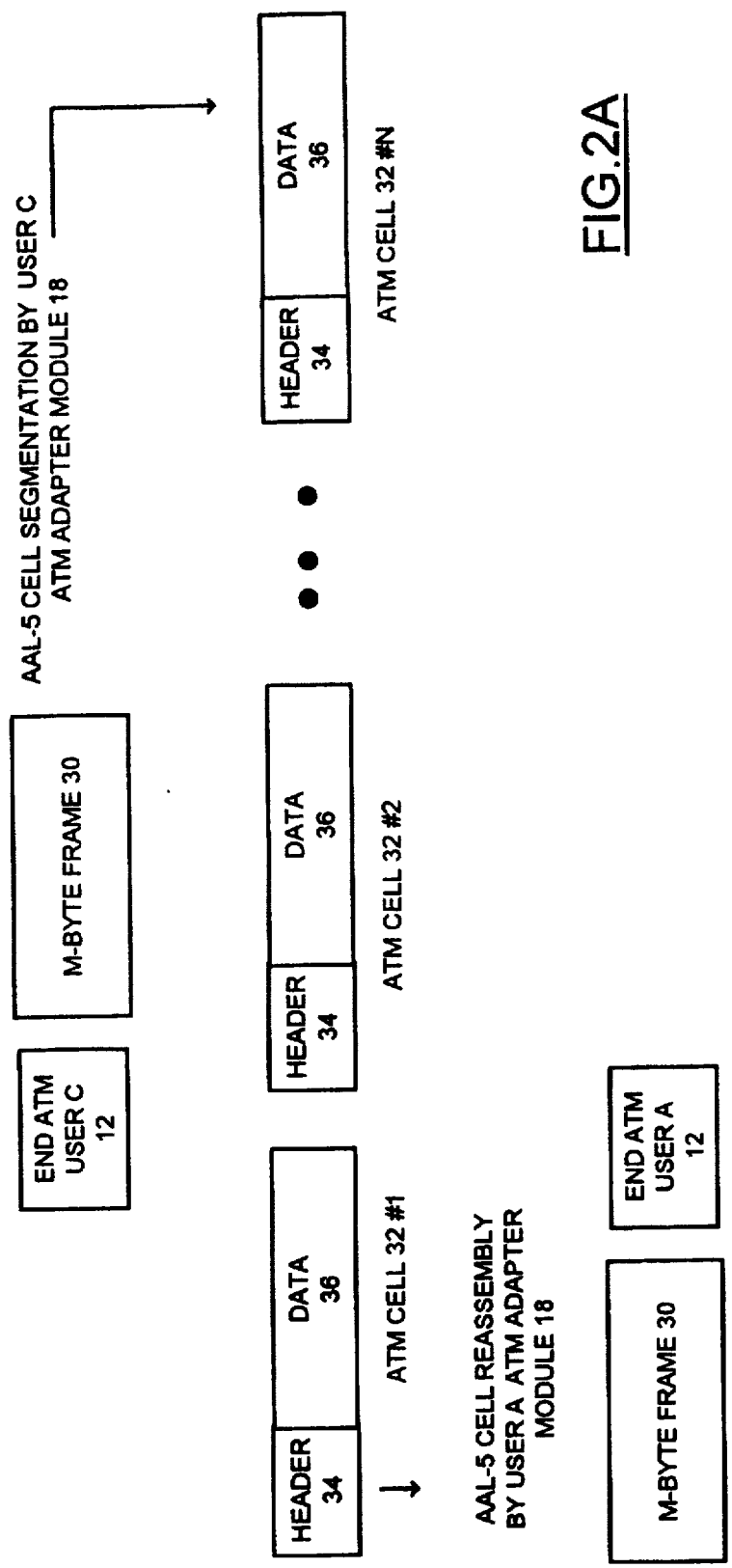
FIG. 2A is a chart illustrating AAL-5 cell segmentation and reassembly.

Referring to FIGS. 1A and 2A, END ATM USER A 12 and END ATM USER C 12 establish a connection. The connection is an ATM connection for ATM AAL-5 (ATM Adaptation Layer for simple and efficient transport of frame traffic). An AAL-5 frame 30 is sent by the END ATM USER C or user software that contain M-bytes. ATM adapter module 18 associated with sending node C segments large data blocks or AAL-5 frames 30 into 48-byte ATM cells 32. The 48-byte ATM cells 32 (1–N) are sent consecutively from the one node END ATM USER C 12 to the other node A END ATM USER 12. The AAL-5 packet or frame is segmented into a stream of ATM cells 32 by the ATM adapter module 18 of the sending node C. Each ATM cell includes a header 34 and a payload or data 36. The 5-byte header 34 provided on each ATM cell 32 identifies the established connection between ATM END USER A 12 and ATM END USER C 12 together with other information. Each ATM cell includes 48-bytes of data 36 in each ATM cell 32. In each frame, 8-bytes of framing data is carried in the last cell N of the AAL-5 frame. The stream of ATM cells 32 (1–N) is transported on cable 16 to the ATM adapter module 18 of the receiving node A. The receiving node ATM adapter module 18 reassembles the ATM cells 32 (1–N) to the M-byte frame 30 used by the ATM USER A.

Figure 2B:
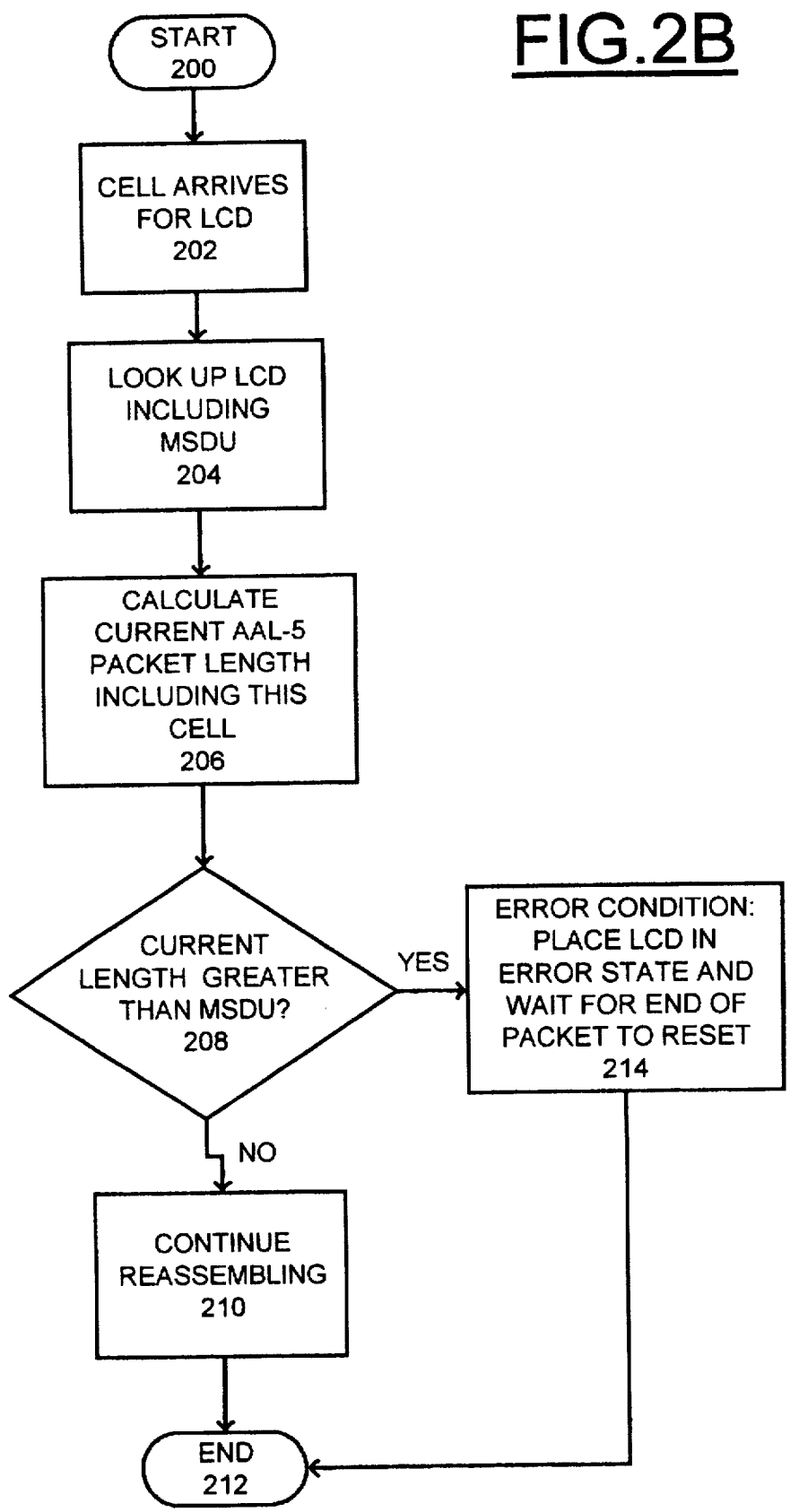
FIG. 2B is a logical flow diagram of an ATM reassembly layer employed for an AAL-5 cell reassembly process in accordance with the present invention.

Referring to FIG. 2B, there is shown a logical flow diagram of an ATM reassembly process employed for an AAL-5 cell reassembly by ATM adapter module 18 in accordance with the present invention. The cell-to-frame reassembly process begins at a block 200. An ATM cell is received for a particular connection as indicated at a block 202. ATM adapter module 18 identifies a logical channel descriptor (LCD) that includes the maximum segmentation data unit (MSDU) value for the connection as indicated at a block 204. ATM adapter module 18 enforces a maximum reassembly size measured in a maximum number of ATM cells based on the identified LCD user MSDU value. The MSDU value can be provided for the each connection END ATM USER 12 via a user interface to the ATM adapter module 18 or by setup signaling before a particular connection is established. The encountering of the maximum within the SAR-layer triggers the appropriate action for the defined error state.

ATM adapter module 18 calculates a current AAL-5 packet length including the ATM cell received at block 202 as indicated at a block 206. The calculated current AAL-5 packet length or frame length is compared with the MSDU value as indicated at a decision block 208. If the calculated current AAL-5 packet length is less than or equal to the MSDU value at decision block 208, reassembling of the AAL-5 frame 30 is continued as indicated at a block 210. ATM adapter module 18 reassembles the ATM cells progressively as they consecutively arrive at block 210. If successful, the M-bytes frame 30 is reassembled intact.

Otherwise if the frame is too large, that is, the number of N ATM cells 32 is more than the maximum number of ATM cells 32 for the connection (M), then an error condition is identified, placing the LCD in an error state and waiting for an end of the AAL-T packet to reset as indicated at a block 214. The last ATM cell of an AAL-5 frame has a special bit in the ATM cell header 34 indicating "last cell". Any further cells are discarded up to and including the last ATM cell. Subject to a selected implementation, the partial reassembled packet may be discarded, signaled and handed off to the END ATM USER 12 with for example, indication of partial frame, or an error counter may be incremented. Then the reassembly function terminates with the error condition when the last ATM cell is encountered as indicated at a block 214. ATM cells can be lost, including the last ATM cell. With the loss of the last ATM cell or the last ATM cell is missing, when the cell arrives that causes the current length to be identified as greater than the MSDU value at decision block 208, then reassembly also can be immediately terminated without waiting for the last ATM cell to reset the error condition at block 214.

While the present invention has been described with reference to the details of the embodiments of the invention shown in the drawing, these details are not intended to limit the scope of the invention as claimed in the appended claims.

What is claimed is:

1. An ATM cell-to-frame reassembly method comprising the steps of:

providing a connection between a plurality of END ATM USERS, each of said plurality of END ATM USERS having an END ATM USER connection;

providing for each END ATM USER connection a value defining a maximum number of ATM cells;

receiving an ATM cell for an END ATM USER connection;

identifying said maximum number of ATM cells value associated with said END ATM USER connection;

calculating a current frame length including said received ATM cell; and comparing said calculated current frame length with said identified maximum number of ATM cells value;

continuing reassembly of the frame responsive to said calculated current frame length less than or equal to said identified maximum number of ATM cells value; and terminating reassembly of the frame responsive to said calculated current frame length greater than said identified maximum number of ATM cells value.

2. An ATM cell-to-frame reassembly method as recited in claim 1 further includes the step of identifying an error condition responsive to terminating reassembly of the frame.

3. An ATM cell-to-frame reassembly method as recited in claim 1 wherein said step of providing for each END ATM USER connection a value defining a maximum number of ATM cells includes the step of identifying an logical channel descriptor (LCD) including a maximum segmentation data unit (MSDU) value for each END ATM USER connection.

4. An ATM cell-to-frame reassembly method as recited in claim 3 wherein said maximum segmentation data unit (MSDU) value is a predefined field of said logical channel descriptor (LCD).

5. An ATM cell-to-frame reassembly method as recited in claim 1 wherein said step of providing for each END ATM USER connection a value defining a maximum number of ATM cells includes the step of providing an END ATM USER interface to an ATM adapter module segmentation and reassembly layer.

6. An ATM cell-to-frame reassembly method as recited in claim 1 said step of terminating reassembly of the frame responsive to said calculated current frame length greater than said identified maximum number of ATM cells value includes the step of placing said END ATM USER connection in an error state.

7. An ATM cell-to-frame reassembly method as recited in claim 6 further includes the step of waiting for a last ATM cell and resetting said error state for said END ATM USER connection.

8. Apparatus for ATM cell-to-frame reassembly comprising:

means for providing a connection between a plurality of END ATM USERS, each of said plurality of END ATM USERS having an END ATM USER connection;

means for providing for each END ATM USER connection a value defining a maximum number of ATM cells;

means responsive to receiving an ATM cell for an END ATM USER connection for identifying said maximum number of ATM cells value associated with said END ATM USER connection;

means for calculating a current frame length including said received ATM cell;

means for comparing said calculated current frame length with said identified maximum number of ATM cells value;

means for continuing reassembly of the frame responsive to said calculated current frame length less than or equal to said identified maximum number of ATM cells value; and means for terminating reassembly of the frame responsive to said calculated current frame length greater than said identified maximum number of ATM cells value.

* * * * *